Feb. 24, 1953   S. L. JOHNSTON   2,629,198
LIVE BAIT SAVING BOBBER
Filed April 15, 1950

INVENTOR.
Stephen L. Johnston,
BY Spencer, Johnston,
Cook & Root,

Patented Feb. 24, 1953

2,629,198

UNITED STATES PATENT OFFICE 2,629,198

LIVE BAIT SAVING BOBBER

Stephen L. Johnston, Chicago, Ill.

Application April 15, 1950, Serial No. 156,177

5 Claims. (Cl. 43—41.2)

This invention relates to an article of fishing equipment and more particularly to a bobber for protecting live bait from loss while casting.

It is often desirable when fishing to cast live bait, such as minnows, to a point a considerable distance from the fisherman. The technique of casting live bait by rod and reel or throwline is well known, but it is equally well known that such casting of live bait often results in loss or destruction of the bait due to the force with which it strikes the water at the distant position.

It is an object of this invention to provide a device which will prevent loss of live bait by casting.

Another object of the invention is to provide a protector for live bait which will serve other useful purposes and which will not frighten fish away.

A further object of the invention is to provide a device which is adaptable for casting into either shallow or deep waters.

These and other objects and features of the invention will be further described in connection with the accompanying drawings, in which.

Figure 1:
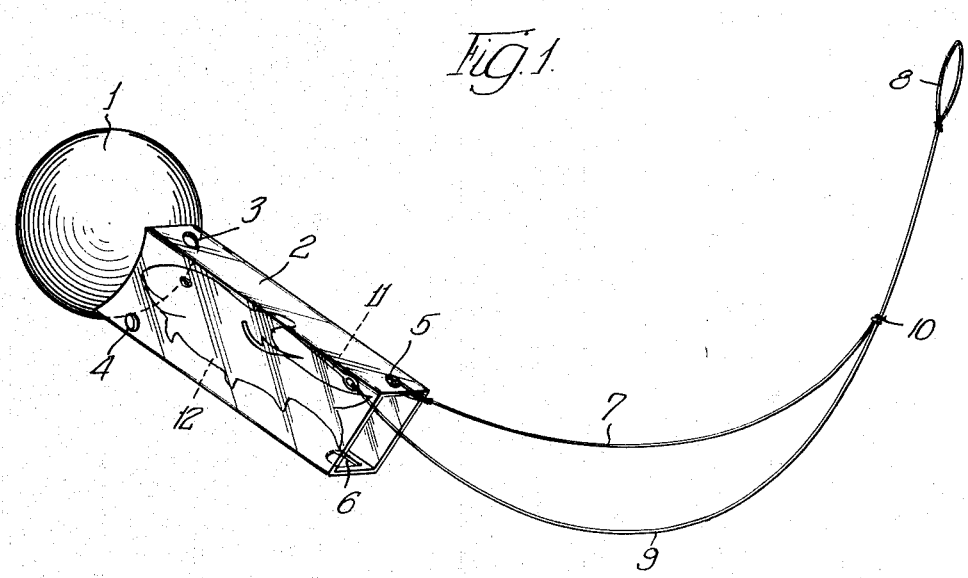
Figure 1 is an isometric view of the preferred embodiment for use in shallow water.

The invention pertains generally to a device which is a combination of a bobber and a live bait protector arranged in such a way that the bait may be inserted into the device and cast. After the device has struck the water it assumes a position such that the bait falls out of the protector and the device serves as a bobber.

In the drawings a float 1 is securely attached to one end of a chamber 2. Near the same end of the chamber are located the holes 3 and 4 which provide an inlet and outlet for air and water. The chamber 2 is illustrated as being roughly rectangular in shape but it will be understood that it may take any other shape, such as square, oval or round. Near the open end of the chamber is located another hole 5 and a latch receiving opening 6. In the embodiment illustrated in Figure 1 which is especially suited for shallow water fishing, the latch opening 6 serves no specific purpose. But in the embodiment illustrated in Figure 2 which is best suited for deep water fishing, the latch opening 6 is important, as hereinafter described.

In Figure 1 a main leader 7 is secured to the chamber 2 by tying the leader through the hole 5. The main leader 7 has a loop 8 for attachment to the main fish line (not shown), and a hook leader 9 attached to it at 10. The free end of the leader 9 is secured to a hook 11 which has an article of bait 12 fastened thereon.

To use the device of Figure 1 the fisherman attaches the main leader 7 to the fish line (not shown) and prepares to cast. The bait article 12 is affixed to the hook 11 and both are inserted into the hollow chamber 2. The cast is made and the device comes to rest on the surface of the water at a point remote from the fisherman. The heavier weight of the loaded chamber 2 causes it to be submerged but the float 1 remains at the surface. This action causes the chamber to assume a vertical position with the open end pointing downward. The weight of the hook and bait causes them to fall out of the chamber and become suspended by the leader 9 from the juncture 10 with the main leader 7. When the bait is struck or swallowed by a fish the movement of the bait and hook will cause the float 1 to become agitated at the surface of the water. This is a signal to the fisherman to reel in the catch.

Figure 2:
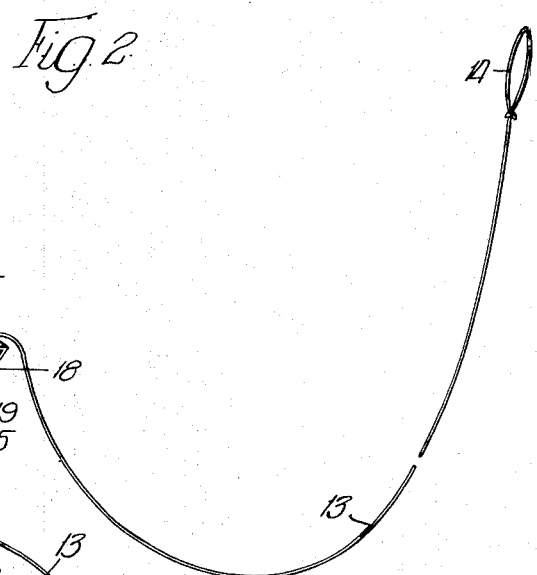
Figure 2 is an isometric view of the embodiment preferred for use in deep water.
Figure 3:
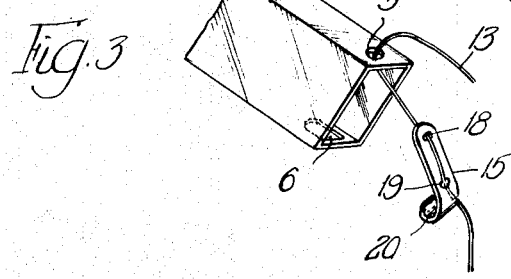
Figure 3 is a fragmentary view of the device shown in Figure 2 illustrating the disengagement of the latch after the cast is made.

In Figures 2 and 3 a main leader 13 has a loop 14 at one end thereof for attachment to the main fish line (not shown). The leader 13 is threaded through the hole 5 in the chamber 2 and has attached thereto a latch 15 and a hook 16. The hook 16 has a bait 17 affixed thereon.

In the use of this embodiment of the invention the latch 15 is secured on the leader 13 a short distance from the hook end thereof by threading the leader 13 through the holes 18 and 19 in the latch 15 and knotting the leader to prevent movement of the latch with respect to the leader. The hook 16 is then baited and the hook and bait are placed inside the chamber 2. The latch 15 is turned so the hook portion 20 thereof may be positioned in the latch receiving opening 6. The leader 13 is now drawn taut and the latch assumes the position illustrated in Figure 2.

The device illustrated in Figure 2 is ready for casting. When the device strikes the surface of the water the heavier portion represented by the bait and chamber 2 will submerge while the float 1 will remain on the surface. As the chamber assumes a downwardly pointing vertical position, the bait and hook will fall out by gravity and will disengage the latch hook portion 20 from the opening 6 as shown in Figure 3. Hook, bait and latch will sink until downward movement is arrested by the fisherman. The leader remains attached to the device through the hole 5 in the chamber. Hence, any abrupt movement of the bait, as by being struck or swallowed by a fish, will cause the device to bob at the surface and signal the fisherman to reel in the line.

It is contemplated that the float 1 may be made of cork or other buoyant material, or it may be a hollow plastic ball inflated with air. Articles of this type are commonly known, for example, the inflated balls made of vinyl resins. The invention is not limited to any particular type of float.

The body or chamber 2 is preferably, but not necessarily, made of a transparent plastic material such as the transparent vinyl plastics, the transparent cellulose acetate resins, or the methacrylate resins of the Lucite and Plexiglas type. It is preferable to use a transparent material in order that the chamber will not cast any unnecessary shadows in the water and frighten the fish away. The vents 3 and 4 in the chamber 2 are important to the operation of the device. When the chamber strikes the water it is necessary that the air in the float end of the chamber be allowed to escape and be replaced with water. Otherwise the chamber will not assume the vertical position readily and the bait may be retained in the chamber. This undesirable possibility is obviated by the holes 3 and 4 which allow the air to escape and be replaced by water.

The latch 15 may suitably be made of metal or plastic and the leaders 7, 9 and 13 may be of any conventional material such as gut or nylon.

It will be apparent that I have provided a new and useful invention for the use of fishermen which will result in a saving of live bait to them. The device also prevents the stunning or killing of live bait by casting it a considerable distance whereby it strikes the water with force. Lastly the device combines the features of a bobber with the bait saving feature thereby serving a dual purpose. The lightness and simplicity of the device also lend to its utility.

I claim:

1. In a bobber of the class described, the combination of a float, a hollow chamber secured at one end to said float and open at the opposite end, said chamber being adapted to contain a bait to be cast and to protect the same and being provided adjacent the open end with an opening adapted to receive a latch and with a hole adapted to receive a leader, and latch means provided with holes to receive the leader and adapted to be received by said opening.

2. In a bobber of the class described, the combination of a float, a hollow chamber secured at one end to said float and open at the opposite end, said chamber being adapted to contain a bait to be cast and to protect the same and being provided adjacent the open end with an opening adapted to receive a latch and with a hole adapted to receive a leader, and latch means adapted to be received by said opening, said latch means consisting of a member adapted to extend over a substantial portion of the open end of said chamber and provided with a pair of holes for attachment to said leader and there being one portion of said latch member adapted to extend to the outside of said chamber.

3. In a bobber of the class described, the combination of a float, a hollow chamber secured to said float at one end and open at the opposite end, said chamber being provided with a plurality of vents adjacent the float end thereof and with a latch receiving opening adjacent the open end thereof, a main leader adapted for slidable attachment within said chamber, a hook secured to one end of said leader and a generally J-shaped latch having holes for connection to said leader and adapted to be positioned in said opening, said hook being adapted to fit into said hollow chamber.

4. A bobber comprising two bodies secured to each other and of different relative sizes, one body being hollow throughout its length and open at its ends, the other body constituting a closure for one of the open ends, a partial closure for the other open end, said partial closure and said hollow body having readily separable connections and said partial closure having holes therein, the hollow body having a hole at one end thereof whereby a leader passing through the last named hole and the holes in the closure and provided with a hook on one end thereof retains the closure in detachable relation with respect to the hollow body member.

5. The combination of a float and a bait container, said bait container being open at opposite ends thereof, said float abutting one of said open ends, a closure for the other open end having holes therein, said closure and container having readily detachable connecting means for retaining said closure in abutting relation with said other open end of said container, said container having a hole in a side wall portion thereof whereby a leader provided with a hook at one end thereof and a bait attached to the hook is adapted to be received in said container with the leader extending through the holes in the closure and the hole in the sidewall portion of the container, to hold the closure in closed relation relative to the container.

STEPHEN L. JOHNSTON.

REFERENCES CITED

The following references are of record in the file of this patent:

UNITED STATES PATENTS

| Number | Name | Date |
|---|---|---|
| 1,128,205 | White | Feb. 9, 1915 |
| 2,260,705 | Eguchi | Oct. 28, 1941 |
| 2,292,743 | Cordry | Aug. 11, 1942 |
| 2,475,736 | Burrous | July 12, 1949 |
| 2,554,318 | Wardrip et al. | May 22, 1951 |